United States Patent
Kadirkamanathan (10) Patent No.: US 9,646,603 B2
(45) Date of Patent: May 9, 2017

(54) VARIOUS APPARATUS AND METHODS FOR A SPEECH RECOGNITION SYSTEM

(75) Inventor: Mahapathy Kadirkamanathan, Cambridge (GB)

(73) Assignee: LONGSAND LIMITED, Cambridge Business Park (GB)

( * ) Notice: Subject to any disclaimer, the term of this patent is extended or adjusted under 35 U.S.C. 154(b) by 2569 days.

(21) Appl. No.: 12/395,484

(22) Filed: Feb. 27, 2009

(65) Prior Publication Data
US 2010/0223056 A1    Sep. 2, 2010

(51) Int. Cl.
*G10L 15/02*    (2006.01)
*G10L 13/08*    (2013.01)

(52) U.S. Cl.
CPC .............. *G10L 15/02* (2013.01); *G10L 13/08* (2013.01)

(58) Field of Classification Search
USPC .............................. 704/1, 231, 235, 253, 278
See application file for complete search history.

(56) References Cited

U.S. PATENT DOCUMENTS

| | | | |
|---|---|---|---|
| 4,677,673 A * | 6/1987 | Ukita et al. .................... | 704/253 |
| 4,761,815 A | 8/1988 | Hitchcock | |
| 5,636,325 A | 6/1997 | Farrett | |
| 5,832,425 A | 11/1998 | Mead | |
| 6,122,613 A * | 9/2000 | Baker ............................ | 704/235 |
| 6,188,976 B1 | 2/2001 | Ramaswamy et al. | |
| 6,236,964 B1 * | 5/2001 | Tamura et al. ................ | 704/254 |
| 6,668,256 B1 | 12/2003 | Lynch | |
| 7,206,303 B2 | 4/2007 | Karas et al. | |
| 7,272,594 B1 | 9/2007 | Lynch et al. | |

(Continued)

FOREIGN PATENT DOCUMENTS

| | | |
|---|---|---|
| EP | 1 484 774 A1 | 12/2004 |
| GB | 2354101 A | 3/2001 |

(Continued)

OTHER PUBLICATIONS

Cross Reference to Related Applications Under 37 C.F.R. 1.78, 2 pages.

(Continued)

*Primary Examiner* — Richemond Dorvil
*Assistant Examiner* — Mark Villena
(74) *Attorney, Agent, or Firm* — Hewlett Packard Enterprise Patent Department (57) ABSTRACT

A method, apparatus, and system are described for a continuous speech recognition engine that includes a fine speech recognizer model, a coarse sound representation generator, and a coarse match generator. The fine speech recognizer model receives a time coded sequence of sound feature frames, applies a speech recognition process to the sound feature frames and determines at least a best guess at each recognizable word that corresponds to the sound feature frames. The coarse sound representation generator generates a coarse sound representation of the recognized word. The coarse match generator determines a likelihood of the coarse sound representation actually being the recognized word based on comparing the coarse sound representation of the recognized word to a database containing the known sound of that recognized word and assigns the likelihood as a robust confidence level parameter to that recognized word.

23 Claims, 5 Drawing Sheets

(56) References Cited

U.S. PATENT DOCUMENTS

| | | | |
|---|---|---|---|
| 7,292,979 | B2 | 11/2007 | Karas et al. |
| 7,406,408 | B1 | 7/2008 | Lackey et al. |
| 7,478,038 | B2 | 1/2009 | Chelba et al. |
| 8,031,849 | B1* | 10/2011 | Apple et al. ............... 379/145 |
| 8,401,847 | B2* | 3/2013 | Ogata et al. ............... 704/235 |
| 2002/0116196 | A1* | 8/2002 | Tran .......................... 704/270 |
| 2003/0088397 | A1* | 5/2003 | Karas et al. ................... 704/1 |
| 2003/0110035 | A1* | 6/2003 | Thong et al. ............. 704/254 |
| 2003/0229497 | A1* | 12/2003 | Wilson et al. ........... 704/270.1 |
| 2004/0030550 | A1* | 2/2004 | Liu et al. ................. 704/231 |
| 2005/0216269 | A1* | 9/2005 | Scahill et al. ........... 704/270.1 |
| 2005/0234722 | A1 | 10/2005 | Robinson et al. |
| 2006/0149558 | A1* | 7/2006 | Kahn et al. ............. 704/278 |
| 2007/0185714 | A1* | 8/2007 | Kim et al. ............... 704/254 |
| 2007/0208561 | A1* | 9/2007 | Choi et al. .............. 704/231 |
| 2007/0288242 | A1* | 12/2007 | Spengler et al. ......... 704/275 |
| 2008/0126089 | A1* | 5/2008 | Printz et al. ............. 704/235 |
| 2008/0255844 | A1 | 10/2008 | Wu |
| 2008/0256033 | A1* | 10/2008 | Cheng ........................ 707/3 |
| 2008/0270110 | A1* | 10/2008 | Yurick et al. ............... 704/3 |
| 2008/0294441 | A1* | 11/2008 | Saffer ....................... 704/255 |
| 2009/0012790 | A1* | 1/2009 | Yamada et al. .......... 704/251 |
| 2009/0063147 | A1* | 3/2009 | Roy .......................... 704/251 |
| 2009/0234648 | A1* | 9/2009 | Nagatomo ................ 704/235 |
| 2010/0004930 | A1* | 1/2010 | Strope et al. ............. 704/240 |
| 2010/0057457 | A1* | 3/2010 | Ogata et al. .............. 704/235 |
| 2010/0094630 | A1* | 4/2010 | Yoakum .................... 704/254 |

FOREIGN PATENT DOCUMENTS

| | | |
|---|---|---|
| GB | 2381638 A | 5/2003 |
| GB | 2381688 A | 5/2003 |
| GB | 2388738 A | 11/2003 |
| GB | 2388739 A | 11/2003 |
| GB | 2457855 A | 9/2009 |
| GB | 2465383 A | 5/2010 |
| GB | 2468203 A | 9/2010 |
| WO | 2008/124368 A1 | 10/2008 |

OTHER PUBLICATIONS

United Kingdom Intellectual Property Office, Search Report for UK Patent Application No. GB 1007584.4, Sep. 3, 2010, 4 pages.

United Kingdom Intellectual Property Office, Search Report for UK Patent Application No. GB 1010370.3, Oct. 15, 2010, 4 pages.

Iyer, Rukmini et al., "Using Out-of-Domain Data to Improve In-Domain Language Models," IEEE Signal Processing Letters, vol. 4, No. 8, Aug. 1997, pp. 221-223.

Gale, William A., et al., "Good-Turing Frequency Estimation Without Tears," http://www.grsampson.net/AGtfl.html, May 1, 2009, pp. 1-23.

Niesler, Thomas, et al., "Language Indentification and Multilingual Speech Recognition Using Discriminatively Trained Acoustic Models," Harman/Becker Automotive Systems, Published prior to the filing of this patent application, 6 pages.

Rapajic, Uros, "Using Phone Recognition and Language Modelling (PRLM) for Automatic Language Identification," http://www.doc.ic.ac.uk/_nd/surprise_96/journal/vol12/ur1/article2.html, 1996, 8 pages.

United Kingdom Intellectual Property Office, Search Report for UK Patent Application No. GB1003097.1, Dated May 13, 2010, 4 Pages.

* cited by examiner

VARIOUS APPARATUS AND METHODS FOR A SPEECH RECOGNITION SYSTEM

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to speech recognition. More particularly, an aspect of an embodiment of the invention relates to speech recognition using multiple resolution analysis and then performing speech analytics on the resultant text.

BACKGROUND OF THE INVENTION

Two types of speech recognition systems can be used today. A continuous speech recognition system is used that receives continuous voice communications as an audio file input. A paused voice command input speech recognition system is also used. Examples of continuous voice communications are audio files of phone conversations, audio files of radio and television shows, and other continuous flowing spoken words files. In continuous voice communications, two separate words may be uttered as close enough in time to confuse a recognition system into having to decide whether a single word or two discrete words where in fact uttered. The system uses the probabilities of words being used in combination to determine whether the single word or two discrete words were in fact uttered. Paused voice command systems are created to eliminate the possibility of this problem from occurring. Typically, in a continuous speech recognition system there is no a priori knowledge to base a guess on what supplied uttered word is trying to be identified/recognized. Also, generally in a continuous speech recognition system the possible vocabulary of words and sounds that can be uttered is extremely large. In contrast, a paused voice command input speech recognition system has a priori knowledge of what possible words will be uttered. The paused voice command input speech recognition system typically has a database of a small set of possible words and sounds that can be uttered from which the system is supposed to recognize. In continuous speech, it is nearly impossible to predict ahead of time when the beginning and ending of words in the stream of continuous speech will individually begin and stop.

SUMMARY OF THE INVENTION

Various methods and apparatus are described for a continuous speech recognition engine that includes a fine speech recognizer model, a coarse sound representation generator, and a coarse match generator. The fine speech recognizer model receives a time coded sequence of sound feature frames, applies a speech recognition process to the sound feature frames and determines at least a best guess at each recognizable word that corresponds to the sound feature frames. The coarse sound representation generator generates a coarse sound representation of the recognized word. The coarse match generator determines a likelihood of the coarse sound representation actually being the recognized word based on comparing the coarse sound representation of the recognized word to a database containing the known sound of that recognized word and assigns the likelihood as a robust confidence level parameter to that recognized word.

The user interface is configured to allow a speech data analytics on each word in the supplied audio file based on the robust confidence level parameter.

BRIEF DESCRIPTION OF THE DRAWINGS

The drawings refer to embodiments of the invention in which.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of memories, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first processor, may be made. However, the specific numeric reference should not be interpreted as a literal sequential order but rather interpreted that the first processor is different than a second processor. Further steps performed in one embodiment may be also be combined with other embodiments. Thus, the specific details set forth are merely exemplary. The specific details may be varied from and still be contemplated to be within the spirit and scope of the present invention.

In general, various methods and apparatus are described for a continuous speech recognition engine that uses robustness as a confidence measure for words output by a speech recognition system as a measure of how confident the system is that each individual word was correctly identified to either or both 1) a database of spoken words and 2) one or more language models.

In an embodiment, the continuous speech recognition engine includes various components. The continuous speech recognition engine uses a multiple resolution analysis to create and calculate word recognition confidence rating associated with each word supplied in an audio file. The continuous speech recognition engine gives the ability to categorize automated speech recognition results on an individual word basis within a stream of continuous communication based on how likely each word has been correctly recognized, which is a very significant advantage. This enables an automatic process or a system to make better decisions based on speech recognition results.

Figure 1:
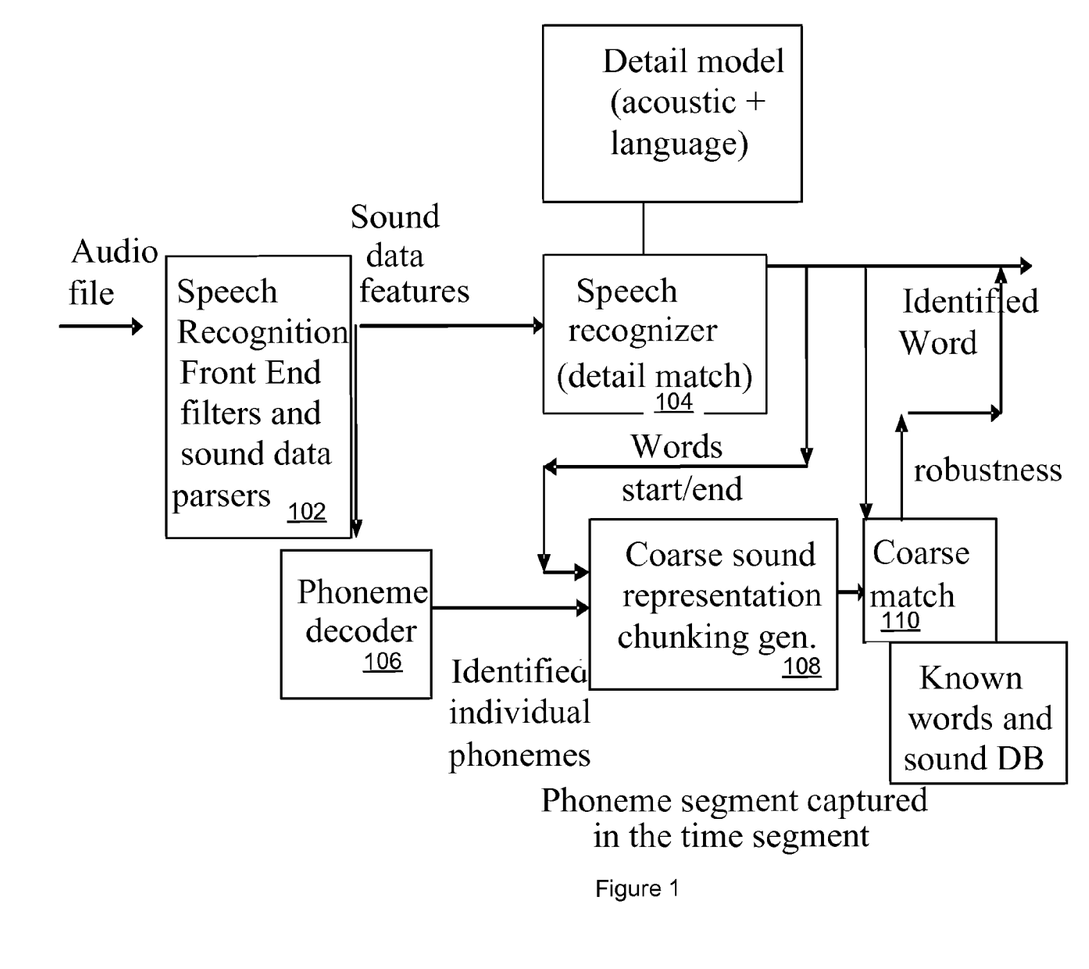
FIG. 1 illustrates a block diagram of a continuous speech recognition engine that compares a recognized word along side the coarse sound representation, captured during same segment of time the recognized word occupies, to the known sounds of that recognized word in a database and then assigns a robustness confidence level parameter to the recognized word.

FIG. 1 illustrates a block diagram of a continuous speech recognition engine that compares a recognized word along side the coarse sound representation, captured during same segment of time the recognized word occupies, to the known sounds of that recognized word in a database and then assigns a robustness confidence level parameter to the recognized word. The continuous speech recognition engine at least includes front-end filters and sound data parsers 102, a fine speech recognizer model 104, a coarse sound representation generator 108, a phoneme decoder 106, a coarse match generator 1110, and a user interface.

The speech recognition front-end filters and sound data parsers 102 convert a supplied audio file of a continuous voice communication into a time-coded sequence of sound feature frames for speech recognition. The front end filters filter out the background noise from the audio file, parse the sounds within the audio file to discrete phonemes and assign a common time code to the audio sounds occurring in the supplied file. The front-end filters 102 also transform the audio sounds into a sequence of sound feature frames, which include sound vectors, which in essence capture the data vectors of the sounds. In an embodiment, a phoneme parser parses the audio signal into individual phonemes. The supplied audio file is time coded. The common time line may be measured in microseconds, audio frames, video frames, or some other measure of time. The multidimensional sound feature frames that include sound data vectors come out of the front end filters of the continuous speech recognition engine at a regular interval. Thus, the front end filters output the time coded sequence of sound feature frames that include sound data vectors at a regular interval to supply the same sound feature frames for analysis by the fine speech recognizer model 104 and the coarse match generator 110.

In an embodiment, when a person speaks, vibrations in the air can be captured as an analog signal. The analog signal may be the supplied audio file. An analog-to-digital converter (ADC) translates this analog wave into digital data that the engine can understand. To do this, the front end filters 102 sample, or digitize, the sound by taking precise measurements of the wave at frequent intervals. The front end filters 102 filter the digitized sound to remove unwanted noise, and sometimes to separate it into different bands of frequency (as differences in human pitch). The front end filters 102 also normalize the sound, or adjusts the sound to a constant volume level. The sound signal may also have to be temporally aligned. People don't always speak at the same speed, so the sound must be adjusted to match the speed of the template sound samples already stored in the system's databases. The system may use these code coded sounds as sound feature frames.

Next, the sound signal is divided into small segments as short as a few hundredths of a second, or even thousandths in the case of plosive consonant sounds—consonant stops produced by obstructing airflow in the vocal tract—like "p" or "t." The phoneme decoder 106 then matches these segments to known phonemes in the appropriate language. A phoneme is the smallest element of a language—a representation of the sounds we make and put together to form meaningful expressions. There are roughly 40 phonemes in the English language (different linguists have different opinions on the exact number), while other languages have more or fewer phonemes.

The fine speech recognizer model 104 receives the time-coded sequence of sound feature frames from the front-end filters 102 as an input. The fine speech recognizer model 104 applies a speech recognition processes to the sound feature frames. The fine speech recognizer model 104 recognizes the sound feature frames as a word in a particular human language and sub dialect of that human language. The fine speech recognizer model 104 then associates these language parameters with the recognized word, together with a start and end time as the recognized word outputted from the fine speech recognizer model. The fine speech recognizer model 104 determines at least a best guess at each recognizable word that corresponds to the sequence of sound feature frames. The fine speech recognizer model 104 supplies the best guess at the identified word resulting from the speech recognition process to the coarse matcher. The fine speech recognizer model 104 may be a complete speech recognition tool that includes a mixture Gaussian distributions of context clustered triphones, with statistical language models, and a Viterbi algorithm and/or use a Hidden Markov Model and neural networks.

In an embodiment, the fine speech recognizer model 104 may be any standard speech recognition tool that outputs its best guess as an identified/recognized word that corresponds to the word uttered in the audio file.

The recognized/identified word outputted by the fine speech recognizer model 104 may include the word itself and parameters associated with the recognized word such as the human spoken language and possibly the subset of dialects/accents within that human spoken language. The recognized word will also include parameters of the start and stop time codes for that recognized word. For example, the recognized word may be 'barn' spoken in US English with a Boston accent with a start time of 1 minute and 6.035 seconds and stop time of 1 minute and 7.005 seconds.

The fine speech recognizer model 104 can examine phonemes in the context of the other phonemes around them. The fine speech recognizer model 104 runs the contextual phoneme plot through a complex statistical model and compares them to a large library of known words, phrases and sentences. The program then determines what the user was probably saying and either outputs the recognized word with a start and stop time.

The fine speech recognizer model 104 may have audio attribute filters that are based upon decomposing digitized speech into its phonetic constructs. The phonetic sequence is then analyzed in conjunction with acoustic model and statistical probabilities to calculate which is the most probable sequence of words and utterances. The audio attribute filters employ recognition technologies that keyword spotting to small and large vocabulary continuous speech recognition and information retrieval from spoken documents—to enable applications in speech and audio processing, such as:

speech recognition, speaker recognition, language recognition and speech enhancement. In an embodiment, the audio attribute filters use neural network technology and "Hidden Markov Models" (HMMs) to construct an acoustic model that is able to provide a fast, accurate and dynamic solution within variable and rapidly changing acoustic environments. The audio attribute filters recognize human speech and logs every spoken word against a common time reference such as a time clock indication or video frame. This generates an index enabling rapid access to the precise moment in time where each word is spoken. The audio sound attribute filters in the fine speech recognizer model 104 monitors the sequence of sound feature frames to detect and identify spoken words, common sounds, human language identification; human accent and dialect identification, and other similar audio sounds.

As discussed, the phoneme decoder 106 also receives the sequence of sound feature frames. The phoneme decoder 106 may compare the sound pattern of each phoneme to a set of phoneme models to recognize the sound feature frames as a sequence of phonemes and identifies each phoneme to that database of known phonemes. The phoneme decoder 106 supplies each identified phoneme in the series of identified phonemes to the input of the coarse sound representation chunking generator 108.

Note, the phoneme decoder 106 may assign a symbolic code to each phoneme based upon recognition of the phonemes from a predetermined set. A database may contains a standard waveform representation of each phoneme from the predetermined set.

The coarse sound representation chunking generator 108 receives both 1) the start and stop times for the time segment associated with the recognized word from the fine model speech recognizer and 2) the series of identified individual phonemes from the phoneme decoder 106 as inputs. The coarse sound representation chunking generator 108 outputs the series of identified individual phonemes occurring within the duration of the start and stop times of the recognized/identified word as an example coarse sound representation of the recognized word. The coarse sound representation of the recognized word is the sequence of actual spoken sounds, such as identified phonemes and/or sound data vectors, etc. that correspond to the duration of the recognized word outputted from the fine speech recognition model 104. The coarse sound representation can include a sequence of phonemes created with the phoneme decoder 106 or other sound data vectors that corresponds to the same time frame that the recognized word occurred within that comes as an output from the fine speech recognition model. The sequence of actual spoken sounds and the recognized word from the fine speech recognition model 104 share the start and stop time from the common time line with the supplied audio file.

A coarse match generator 110 receives the coarse sound representation of the recognized word from the coarse sound representation chunking generator 108 as an input as well as the recognized word from the fine speech recognizer model 104. The coarse match generator 110 then determines the likelihood of the coarse sound representation actually being the recognized word based on comparing the sound of the recognized word to a database containing the known sound in that human language, and potentially sub dialect of that human language, for the recognized word. This likelihood is the robustness measure for the word and becomes an assigned robust confidence level parameter. The coarse match generator 110 compares the recognized/identified word along side the coarse sound representation, such as a set of phoneme captured during same segment of time the identified word occupies, to the known sounds of that identified word in the database and then assign a robustness confidence level parameter to the recognized word. The coarse match generator 110 may also compare the recognized word along side the coarse sound representation to the known sounds of that recognized word in the one or more human language models and then assign a robustness confidence level parameter to the recognized word.

The coarse match generator 110 pairs the robust confidence level parameter for that recognized word with the recognized word from the fine speech recognition model and includes the start and stop time codes from the common time line.

In an embodiment, the coarse match generator 110 may pair more than one recognized word to corresponding robust confidence level parameters. Thus, the coarse match generator 110 pairs the first best recognized word to the Nth best matching words with their corresponding robust confidence level parameters. Each recognized word from the continuous speech recognition engine has a robust confidence level parameter associated with that recognized word and each time the same recognized word is uttered in the audio file, each instance of the recognized word can have its own robust confidence level parameter for that instance of the recognized word, which can differ in robust confidence level from another instance of the recognized word uttered in the same supplied audio file. As discussed, the coarse match generator 110 may receive two or more guesses of the recognized word from the fine speech recognizer model 104 and the coarse match generator 110 only outputs the recognized word with a highest robust confidence level parameter from the two or more guesses.

The coarse match generator 110 may contain a phoneme token model with a dynamic programming search algorithm used to match recognized words in determining the robust confidence level parameter. The coarse match generator 110 may compare the coarse sound representation to the actual sound of the known word in the database rather than comparing the sequence of phonemes to probabilities of words and sounds having likely probabilities of being grouped together, which does occur in the human language models of the fine speech recognizer model.

The components of the continuous speech recognition engine including the coarse match generator 110, phoneme decoder 106, etc. may be a combination of hardware logic and/or software. The software portion may be stored on a machine-readable medium. A machine-readable medium includes any mechanism that provides (e.g., stores and/or transmits) information in a form readable by a machine (e.g., a computer). Therefore the component parts, such as the phoneme decoder 106 or coarse match generator 110, etc. may be fabricated exclusively of hardware logic, hardware logic interacting with software, or solely software.

The continuous speech recognition engine combines fine resolution data and models to perform speech recognition with derived coarse resolution of the same data and models to calculate a measure of fitness of each recognized word. The fine speech recognition model 104 and the coarse speech recognition model 106-110 analyze the exact same sound data when determining the recognized word and the robust confidence level parameter for that recognized word. If a word that is recognizable in the fine resolution also shows good fitness in the coarse resolution, then the recognized word is deemed to have a high level of robustness. On the other hand, if the recognized word shows poor fitness the coarse form, then the recognized word has a low level of robustness associated with that recognized word.

In an embodiment as described above, the fine model speech recognizer supplies a best guess at the identified word resulting from the speech recognition process to the coarse match generator 110. The coarse match generator 110 compares the identified word along side the coarse sound representation, captured during same segment of time the identified word occupies, to the actual known sounds of that identified words in the database and assign a robustness rating to the identified word.

However, in another embodiment, N-Best analysis can use best identified phoneme sounds from phoneme decoder 106 and identified word from the fine speech recognizer model 104 or a set of the 1st best match through Nth best match of possible identified words. For example of the Nth best guesses, the fine speech recognizer model 104 supplies the first, second, and third best word matches to the recognized/identified word resulting from the speech recognition process to the coarse match generator 110. The coarse match generator 110 assigns a robustness rating to each recognized word. For example, the fine speech recognizer model 104 may output the recognized word 'barn' as being the first best guess as well as 'born' as the second best guess and 'Bourne' as the third best guess of the recognized word. The coarse match generator 110 would then compare all three recognized/identified words along side the coarse sound representation to the known sounds of those identified words in the database and assign a robustness rating to each of the three identified words.

The fine speech recognition model 104 may also output multiple permutations of same recognized word with different sub dialects or accents associated with that same recognized word. The coarse match generator 110 then may also output multiple permutations of same recognized word with different sub dialects or accents associated with that same recognized word, all having an assigned robustness rating. For example, the coarse match generator 110 may output the recognized word 'Barn' with parameters of US language model—Boston accent and a robust confidence rating of 95% as being the first best guess as well as 'Barn' US language model—Chicago accent and a robust confidence rating of 90% as being the second best guess of that recognized word. The coarse match generator 110 can also chose to output one recognized word with the highest confidence rating from the multiple recognized words supplied as inputs.

The coarse sound representation generator 108 may receive as an input sound data vectors from a sound decoder rather than phonemes from the phoneme decoder 106.

Figure 2:
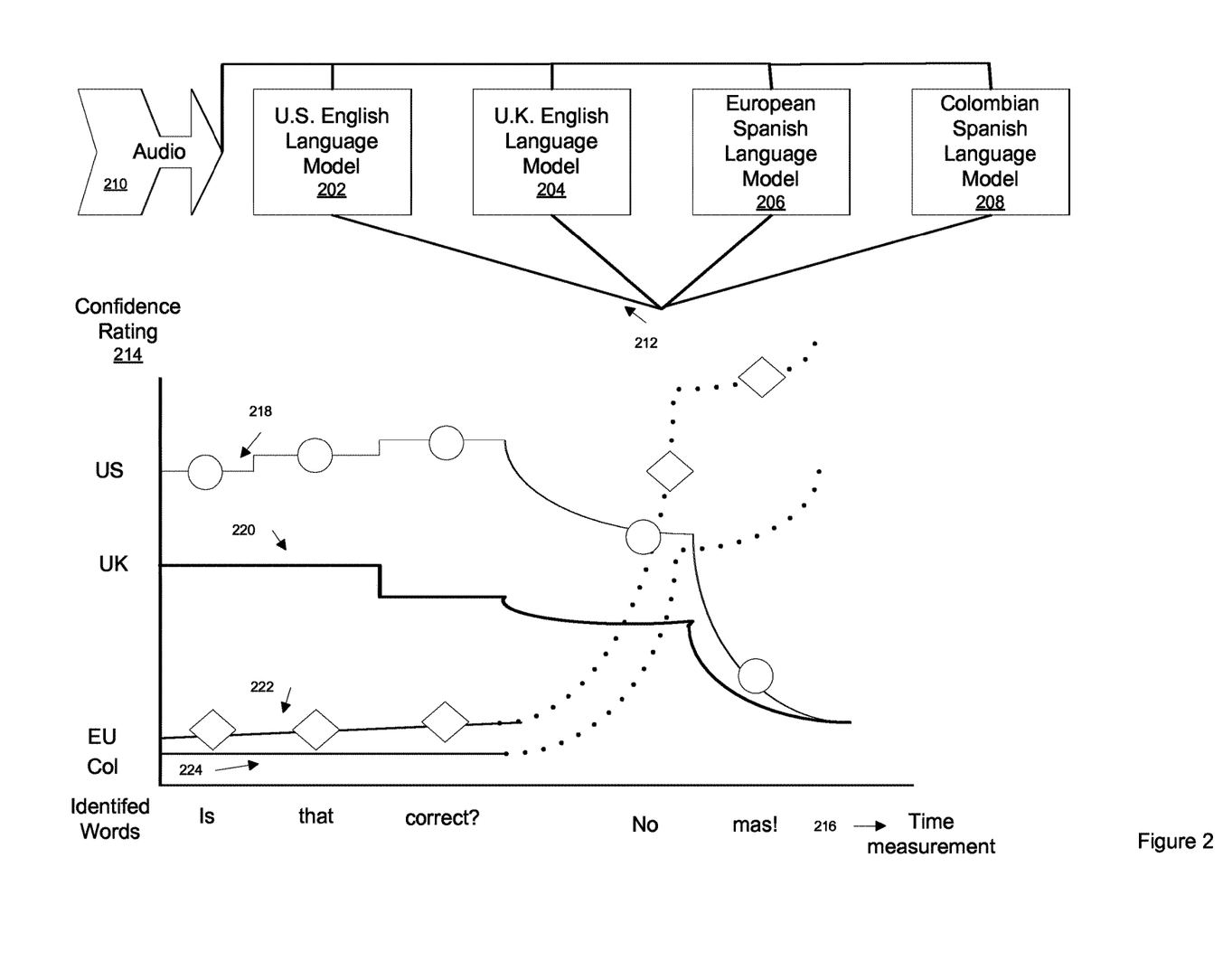
FIG. 2 illustrates an embodiment of an attribute filter in the coarse match generator comparing different human language models at approximately the same time to generate a robust confidence rating for each recognized word.

FIG. 2 illustrates an embodiment of an attribute filter in the coarse match generator comparing different human language models at approximately the same time to generate a robust confidence rating for each recognized word. In an embodiment, a human language and accent attribute filter consists of four language models 202, 204, 206, 208 receiving the audio information stream 210 from the coarse sound representation chunking generator and comparing the output 212 from the different human language models 202, 204, 206, 208 at approximately the same time to generate a robust confidence rating for each recognized word. The four exemplary human language models are a U.S. English language model 202, a U.K. English language model 204, European Spanish language model 206, and a Colombian Spanish language model 208. The human language models 202, 204, 206, 208 may be resident on the same machine or networked across multiple machines. The audio information stream 212 may be originally from an unstructured source such as phone conversation. The exemplary audio information stream 212 is phone conversation between two unknown speakers. The continuous speech recognition engine is monitoring and transcribing the phone conversation. In U.S. English, a first speaker states the words, "Is that correct." In European Spanish, a second speaker responds with the words, "No mas!"

FIG. 2 also illustrates a graph of the confidence rating from each language model 218, 220, 222, 224 for each spoken word over time 216. In an embodiment, each language model 202, 204, 206, 208 generates a confidence factor 218, 220, 222, 224 in the accuracy of each spoken word. For the spoken word "Is" both the U.S. English language model 202 and the U.K. English language model 204 have high confidence factors 218, 220 in identifying the spoken word; however, because of the phonetic emphasis during the pronunciation of the word, "Is" the U.S. English language model 202 generates a higher confidence rating 218. In an embodiment, a comparison between similar language models may be used to determine the accent of the speaker. The European Spanish language model 206 and the Colombian Spanish language model 208 generate a very low confidence rating 222, 224 in the accuracy of identifying the word "Is" because that phonetic sound doesn't equate to an actual word in the Spanish language. The four language models 202, 204, 206, 208 continue detecting and identifying the spoken words "That" and "Correct?" and due to the individual speaker characteristics assign various confidence ratings to the identified words.

A speaker change occurs. A significant change in the value of the confidence rating of a particular language model can be detected. Further, the attribute filter may detect and log a crossover of confidence ratings between the confidence rating from a first language model that was higher and is now lower than a confidence rating from a second language model. The attribute filter may make use of all the captured data to determine if a speaker change occurs such as pauses, confidence rating crossovers, significant changes in the value of the confidence rating.

The second speaker states "No mas!" The four language models 202, 204, 206, 208 generate medium confidence ratings 218, 220, 222, 224 on the accuracy of the spoken word "No" because the word "No" has a meaning and therefore is recognized in all four language models 202, 204, 206, 208. However, the European Spanish language model 206 generates the highest confidence rating 222 due to the phonetic emphasis during the pronunciation of the word, "No." In an embodiment, a moving time frame window may be employed to capture the confidence factors of words spoken in the same sentence or context as the identified word in order to influence the confidence factor assigned to the identified word. When the Spanish spoken word "mas" is pronounced, then the confidence ratings of the English language models 218, 220 lower and the confidence rating of the European Spanish language model 222 due to the accent increases to again be the highest confidence rating. The captured data may be used to generate an accurate transcript of the conversation.

Further, the captured data may be used to identify the unique voice characteristics of the first speaker and second speaker. For example, the first speaker may possess the unique voice characteristics of speaking English with a U.S. accent as well as when the speaker annunciates "Correct?" the confidence rating of a U.S. English language model 218 and European Spanish language model 222 increase while the confidence rating of a UK English language model 220 lowers. In an embodiment, the one or more attribute filters generate a time coded recognized word with a corresponding robust confidence rating in real time. Thus, a triggering and synchronization module (in FIG. 3) may generate an event, such as an alarm, when an attribute filter detects a recognized word on a watch list.

Figure 3:
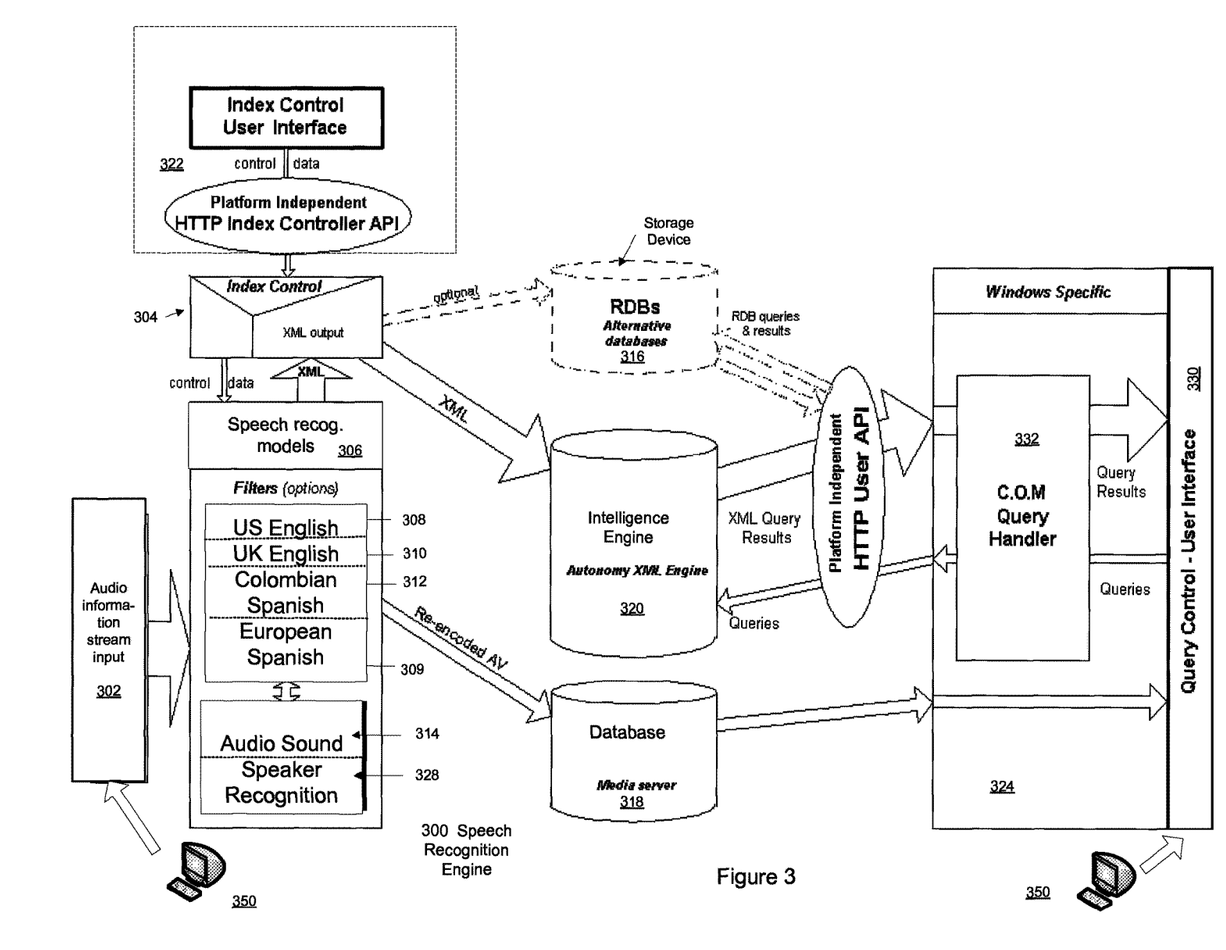
FIG. 3 illustrates an embodiment of a continuous speech recognition engine that converts spoken words in an information stream to written text and generates a separate encoded file for every word in which each file shares a common time reference and possess an assigned robust confidence level parameter to that recognized word.

FIG. 3 illustrates an embodiment of a continuous speech recognition engine that converts spoken words in an information stream to written text and generates a separate encoded file for every word in which each file shares a common time reference and possess an assigned robust confidence level parameter to that recognized word. In an embodiment, the continuous speech recognition engine 300 may include one or more inputs 302 for information streams, an index control module 304, continuous speech recognition fine and coarse models 306 containing one or more attribute filters 308, 309, 310, 312, 314, storage devices such as a rational data base 316 and an audio-visual media server 318, an intelligence engine 320, a triggering and synchronization module 322 including an index control user interface 334, and a manipulation module 324 including a query control user interface 330.

The continuous speech recognition engine 300 can be used by a user from a client machine 350 supplying audio files, including audio visual files, from the client machine 350 over a wide area network, such as the Internet, to a server hosting the continuous speech recognition engine 300 with the robustness measure system.

Overall, in an embodiment, one or more streams of audio information pass through the continuous speech recognition fine and coarse models 306 discussed above. The continuous speech recognition fine and coarse models 306 can send data corresponding to attributes of the information stream passing through the continuous speech recognition models 306 to the index control module 304. The index control module 304 indexes all of the data from the continuous speech recognition model 306. The index control module 304 then may send the indexed data to a storage device 316 as well as the intelligence engine 320. The manipulation module 324 contains a graphic user interface 330 to allow a user to manipulate the indexed data. The triggering and synchronization module 322 allows the user to program events to occur automatically based upon the indexed data passing through the index control module 304.

In an embodiment, the continuous speech recognition engine 300 may have one or more information stream inputs 302 into the continuous speech recognition fine and coarse models 306. In an embodiment, at least one of the information stream inputs 302 includes audio-visual data.

The continuous speech recognition fine and coarse models 306 with the robustness measure system translate the supplied audio and create a time coded text file, where each transcribed word has the robust confidence level parameter as a measure of how confident the system is that the word was correctly identified. Each word in the supplied audio file is stored in a memory with a robust confidence level parameter and the start and stop time codes from the common time line.

Accordingly, the user interface 330 may supply a transcript of recognized words in which those recognized words below a threshold robust confidence level are indicated in the transcript. The intelligence engine 320 may assign a higher weight to recognized words with a robust confidence level above a threshold than recognized words below the threshold, and use the weight for the recognized words when queries are made with the user interface 330. The user interface 330 is configured to allow a speech data analytics on each word in the supplied audio file 302 stored in the memory based on the robust confidence level parameter.

For example, a user from a client machine 350 may then supply to the user interface 330 query words of interest to find out if the supplied audio file 302 contains any of the query words. The intelligence engine 330 identifies recognized words below a certain robust confidence level to be filtered out from the query or just placed in a hierarchical rank list at the bottom of the ranked list due to the weighting associated with the recognized words below a certain robust confidence level. The user may then activate/click a link to the returned time segments containing those recognized words matching the query words and listen to a segment of the audio file pertinent to when those words are spoken in the supplied audio file 302.

Similarly, the continuous speech recognition engine 300, that may be resident on the server, can also monitor call center audio conversations and identify when certain words of interest are spoken with the triggering and synchronization module 322. The triggering and synchronization module 322 then directs a user on the client machine 350 to the time segment containing those words matching the trigger words and allow the user to listen to a segment of the audio file pertinent to when those trigger words are spoken in the supplied audio file. The triggering and synchronization module 322 may send an event notification to the client machine 350 over the network so the user on the client machine 350 can activate/click on the notification to allow the user to listen to the segment of the audio file pertinent to when those trigger words are spoken in the supplied audio file 302.

The user interface 330 has an input to receive the supplied audio files from a client machine 350 over a wide area network and supply the supplied audio files 302 to the continuous speech recognition fine and coarse models 306. The continuous speech recognition models 306 contains various human language models 308, 310, 312, 314 which the fine and coarse models use. For example, an embodiment may contain attribute filters including a various human language models including United States English 308, United Kingdom English 310, European Spanish 309, Colombian Spanish 312, and an audio sound attribute filter 314. In an embodiment, the one or more attribute filters 308, 309, 310, 312, 314 may identify attributes from each stream of information. The identified attributes may be a human language type, a change in human language type being spoken, a human accent, a change in human accent being spoken, speaker's individual voice characteristic, a change of speaker, discrete spoken words, individual written words, and other similar characteristics. In an embodiment, each attribute filter 308, 309, 310, 312, 314 may be separated into discrete modules to increase the focus, efficiency, and resolution capability of that individual module. In an embodiment, each attribute filter 308, 309, 310, 312, 314 detects for specific attributes from the information stream input data such as the human language type being spoken, speaker changes, each word spoken by a speaker, etc. Each attribute filter 308, 309, 310, 312, 314 then identifies that detected attribute. Once the attribute is identified by a given attribute filter 308, 309, 310, 312, 314, then the identified attribute is encoded into a computer language.

For each recognized word, the attribute filter generates an individual XML document including as elements the identified word, the confidence rating from each language model, and the time code for that word. The transcript of the entire supplied audio file corresponds with an overall XML document for that conversation. However, because each word is a discreet XML document itself within the aggregate XML document, then a user may select a phrase or portion within the transcript and start playing the audio segment from that exact moment in time corresponding to the selected phrase.

In an embodiment, the audio information stream 302 passes through the continuous speech recognition fine and coarse models 306 in a single pass rather than the audio information stream being sequentially analyzed first by a first language model and then by the next language model.

The manipulation-module 324 interacts with the storage devices 316 and the intelligence engine 320 to allow a user to navigate and utilize an indexed stream of recognized words. Due to the recognized words begin organized through a time ordered index, transmodal manipulations of each type of attribute may occur. A user from a client machine 350 through the user interface 330 may perform operations on a first set of attributes in order to manipulate a second set of attributes.

For example, a user may create a new audio clip of a desired segment of a radio broadcast by highlighting the transcript text and cutting the transcript text from the text document. Further, the user may splice multiple video clips together by assembling and inserting text corresponding to each video clip. Thus, the user manipulates a first type of attribute such as the transcripted text in order to perform an operation on the second type of attribute such as spoken words or video characteristics.

In natural language and Boolean language queries, the intelligence engine 320 queries a natural language and/or Boolean language query from the manipulation-module 324 against any part of the XML documents stored in the storage, within the intelligence engine 320, and/or storage devices 316 external to the system such as the Internet. The intelligence engine 320 also can be queried to provide suggestions of similar content. Thus, for example, a user may remember three key words about a video segment of information that the user is trying to locate. The user may submit the query through the query control user interface 330 and view the resulting video segments that match the query results on in the display window 333.

In concept matching, the intelligence engine 320 accepts a piece of content or reference (identifier) as an input and returns references to conceptually related items ranked by relevance, or contextual distance. This may be used to generate automatic hyperlinks between pieces of content. Thus, while a live feed is being broadcast, the triggering and synchronization module may display hyperlinks to related documents to the topic which the speaker is talking about based upon concept matching to the indexed transcript correlating to the video segment.

In agent creation, the intelligence engine 320 accepts a piece of content and returns an encoded representation of the concepts, including each concept's specific underlying patterns of terms and associated probabilistic ratings. In agent retraining, the intelligence engine 320 accepts an agent and a piece of content and adapts the agent using the content. In agent matching, the intelligence engine 320 accepts an agent and returns similar agents ranked by conceptual similarity. This may be used to discover users with similar interests, or find experts in a field. This may also be used to identify a particular speaker even though continuous speech recognition engine 300 has no previous knowledge of that speaker.

The robust confidence level assigned to each recognized word outputted from the continuous speech recognition engine 300 may be used in all sort of speech to text applications. Words below a certain robust confidence level may be filtered out from the query or just place in a hierarchical rank list at the bottom, and identified words with a high robust confidence level would be at the top of the hierarchical rank list of matching words to the query. This hierarchical ranked list based on robust confidence level in effect creates a prefilter for the user making the query by ranking the more likely less relevant corresponding matches at the bottom of the list and the more likely relevant matches with the higher weighed values at the top of this list reported back to the user. The continuous speech recognition engine 300 allows the user to prioritize and moderate the search results based on robustness. The continuous speech recognition engine 300 allows different weightings to be applied to words based on robustness ratings during speech data analytics. The robustness rating may be used as a measure of how usable/reliable each word produced is.

The robust confidence level may be used, for example, in a transcript of a speech to text output to indicate recognized words on the transcript as not reliable recognized words but just a guess. Even so, all of the recognized words on the transcript above a certain robust confidence level would not need to be checked manually to debug and validate the text on the transcript. The robust confidence methodology may be used in Audio Electronic Data Discovery in transcript form or in query engine of matching spoken words form. Thus, the robust confidence methodology may be used in various speech data analytics. The continuous speech recognition engine 300 may be used in small-vocabulary possible and many users speech system as well as a large-vocabulary possible and many users speech system.

Figure 4A:
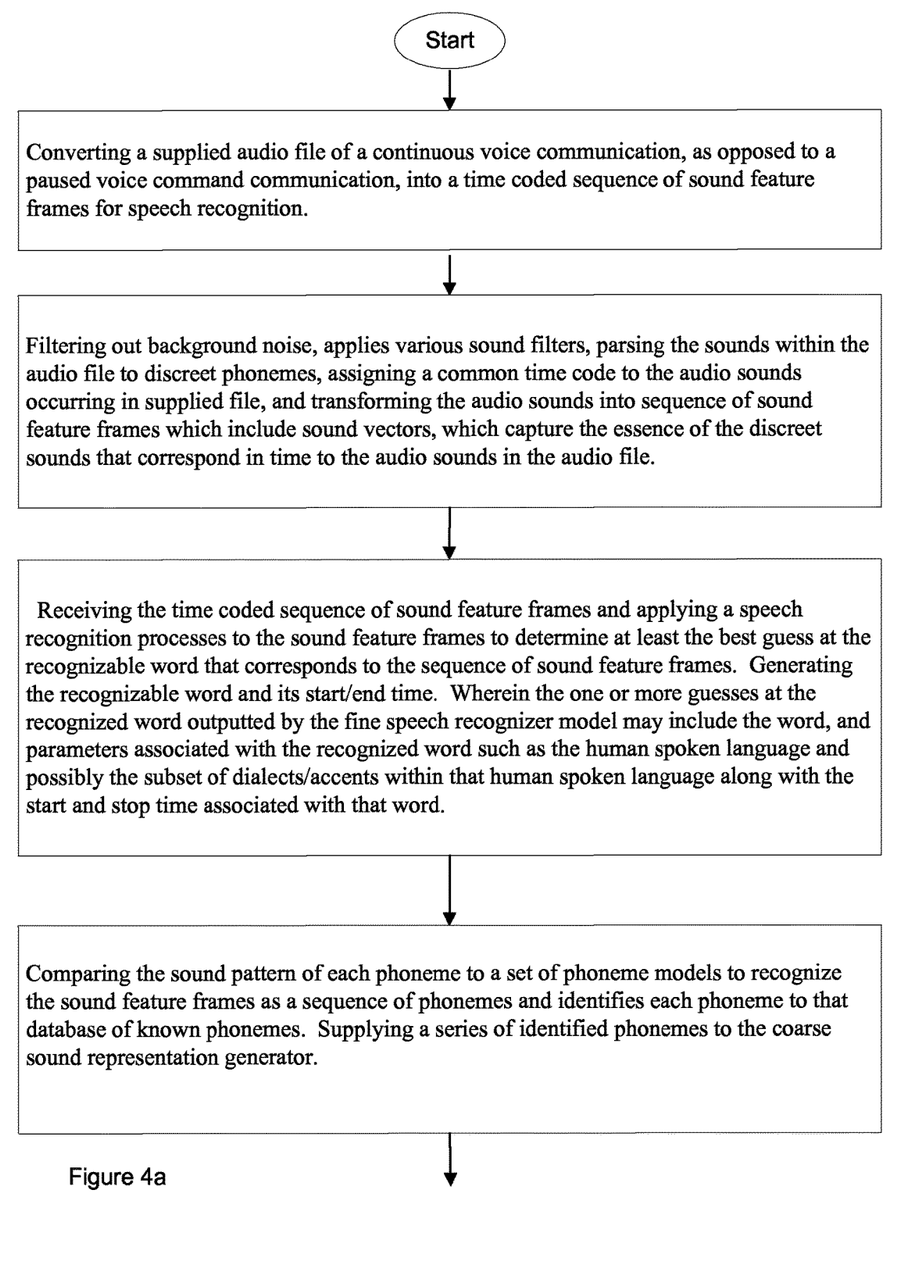
FIG. 4 illustrates a flow diagram of an embodiment of a method for continuous speech recognition that uses robustness as a confidence measure for words output by a speech recognition system as a measure of how confident the system is that each individual word was correctly identified to either or both 1) a database of spoken words and 2) one or more language models.
Figure 4B:
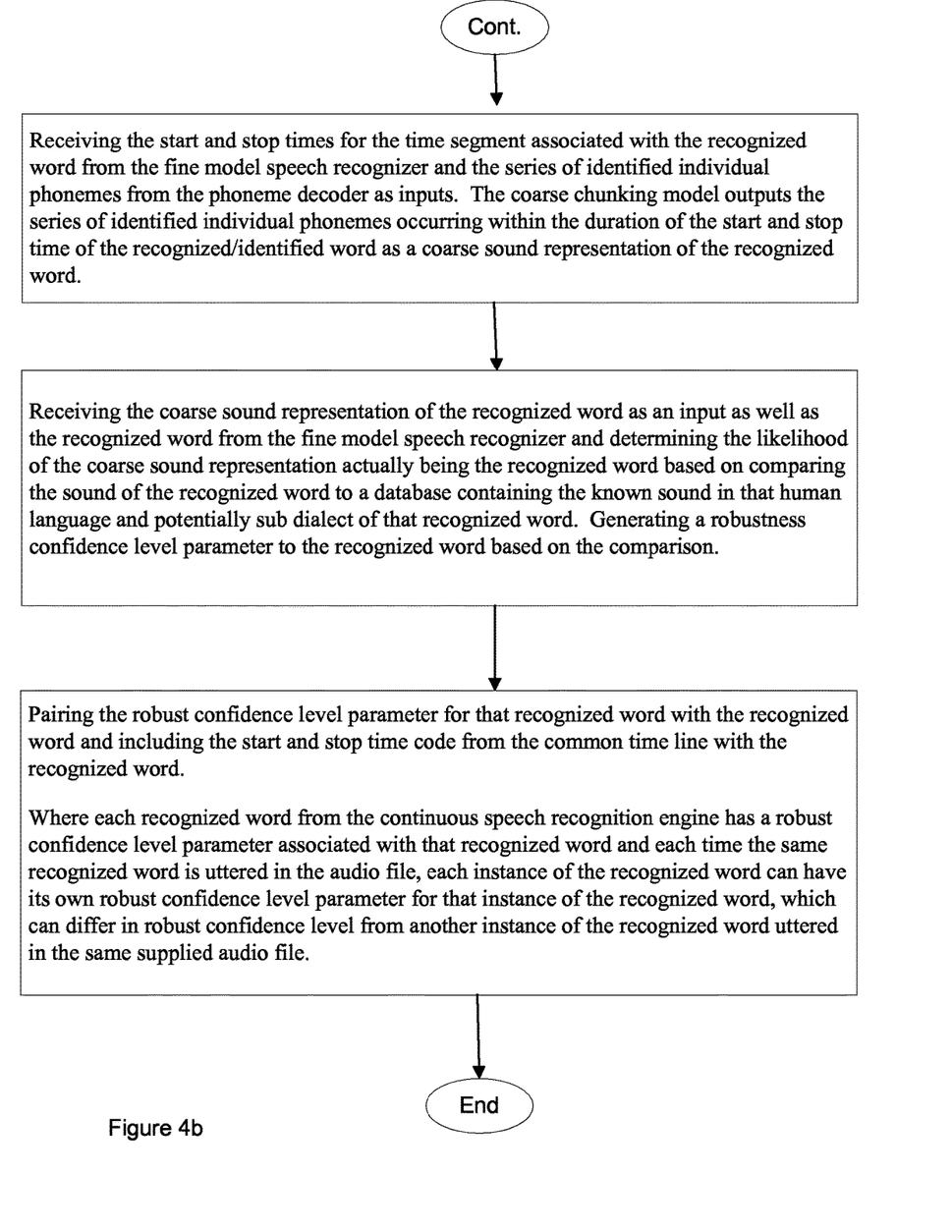

FIG. 4 illustrates a flow diagram of an embodiment of a method for continuous speech recognition that uses robustness as a confidence measure for words output by a speech recognition system as a measure of how confident the system is that each individual word was correctly identified to either or both 1) a database of spoken words and 2) one or more language models. The method may include at least the following steps.

In block 402, the continuous speech recognition engine converts a supplied audio file of a continuous voice communication, as opposed to a paused voice command communication, into a time coded sequence of sound feature frames for speech recognition.

In block 404, the continuous speech recognition engine filters out background noise, applies various sound filters, parsing the sounds within the audio file to discreet phonemes, assigns a common time code to the audio sounds occurring in supplied file, and transforms the audio sounds into sequence of sound feature frames. The sequence of sound feature frames may include sound vectors, which capture the essence of the discreet sounds that correspond in time to the audio sounds in the audio file.

In block 406, the continuous speech recognition engine receives the time coded sequence of sound feature frames and applies a speech recognition processes to the sound feature frames to determine at least a best guess at a recognizable word that corresponds to the sequence of sound feature frames. The continuous speech recognition engine generates the recognizable word and its start and end time.

The one or more guesses at the recognized word outputted by the fine speech recognizer model may include the word itself, and parameters associated with the recognized word such as the human spoken language and possibly the subset of dialects/accents within that human spoken language along with the start and stop time associated with that word.

In block 408, the continuous speech recognition engine compares the sound pattern of each phoneme to a set of phoneme models to recognize the sound feature frames as a sequence of phonemes and then identifies each phoneme to that database of known phonemes.

In block 408, the continuous speech recognition engine supplies a series of identified phoneme to the coarse sound representation generator.

In block 410, the continuous speech recognition engine receives the start and stop times for the time segment associated with the recognized word from the fine model speech recognizer and the series of identified individual phonemes from the phoneme decoder as inputs. The coarse chunking model outputs the series of identified individual phonemes occurring within the duration of the start and stop time of the recognized/identified word as a coarse sound representation of the recognized word.

In block 412, the continuous speech recognition engine receives the coarse sound representation of the recognized word as an input as well as the recognized word from the fine model speech recognizer. The continuous speech recognition engine compares the recognized word along side the coarse sound representation, captured during same segment of time the recognized word occupies, to the actual known sounds of that recognized word in a database and then assigns a robustness confidence level parameter to the recognized word based on the comparison. The system may have the sound of the recognized word to in multiple databases containing the known sound in that human language and potentially sub dialect of that human language. The continuous speech recognition engine generates a robustness confidence level parameter to the recognized word based on the comparison.

In block 414, the continuous speech recognition engine pairs the robust confidence level parameter for that recognized word with the recognized word itself and includes the start and stop time codes from the common time line with the supplied audio file. Each recognized word from the continuous speech recognition engine has a robust confidence level parameter associated with that recognized word. Each time the same recognized word is uttered in the supplied audio file, each instance of the recognized word can have its own robust confidence level parameter for that instance of the recognized word, which can differ in robust confidence level from another instance of the recognized word uttered in the same supplied audio file.

In block 414, the continuous speech recognition engine performs speech data analytics on each word in the supplied audio file stored in the memory based on the robust confidence level parameter including categorizing automated speech recognition results on an individual word basis within the supplied audio file of continuous communication based on how likely each word has been correctly recognized.

Additional examples of speech data analytics include the following.

In response to a query, the continuous speech recognition engine identifies recognized words below the threshold robust confidence level to be filtered out from the response to the query or just placed in a hierarchical rank list at the bottom of the ranked list due to the weighting associated with the recognized words below the threshold robust confidence level.

The continuous speech recognition engine presents a link so the user then can activate the link to the returned time segments containing those recognized words matching the query words and listen to a segment of the supplied audio file pertinent to when those words are spoken in the supplied audio file.

The continuous speech recognition engine monitors call center audio conversations and identifies when certain words of interest on a watch list are spoken, and then triggers an event notification across a network to a client machine so a user on the client machine can activate the notification to allow the user to listen to a segment of the audio file pertinent to when those trigger words are spoken in the supplied audio file.

The continuous speech recognition engine generates a time coded text file as a transcript, where each transcribed word has the robust confidence level parameter as a measure of how confident the system is that the word was correctly identified and recognized words below a threshold robust confidence level are indicated in the transcript.

In an embodiment, the software used to facilitate the various parts of the engine can be embodied onto a machine-readable medium. A machine-readable medium includes any mechanism that provides (e.g., stores and/or transmits) information in a form readable by a machine (e.g., a computer having at least one processor). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the hardware logic consists of electronic circuits that follow the rules of Boolean Logic, software that contain patterns of instructions, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. Also, for example, the fine and coarse analysis maybe conducted in a single box—essentially carrying out the same analysis/computations with common databases and models except for the fine analysis doing the extra step of pairing of the weight assigned to the recognized word. The invention is to be understood as not limited by the specific embodiments described herein, but only by scope of the appended claims.

What is claimed is:

1. A continuous speech recognition engine, comprising
an input subsystem configured to convert input audio data into a time coded sequence of sound feature frames for speech recognition;
a fine speech recognizer to apply a speech recognition process to the sound feature frames and determine at least a candidate recognized word that corresponds to the sound feature frames;
a coarse sound representation generator to output a series of individual phonemes occurring within a time duration of the recognized word as a coarse sound representation of the recognized word; and
at least one processor to:
compare the coarse sound representation of the recognized word to a known sound of the recognized word in a database, and
assign a confidence level parameter to the recognized word from the fine speech recognizer according to the comparing.

2. The continuous speech recognition engine of claim 1, wherein the at least one processor is to generate a transcript, where each transcribed word in the transcript has a corresponding confidence level parameter as a measure of how confident a system is that the transcribed word was correctly identified.

3. The continuous speech recognition engine of claim 1, wherein the coarse sound representation generator is to receive as input sound data vectors from a sound decoder, and the coarse sound representation of the recognized word includes a subset of the sound data vectors that correspond to the time duration of the recognized word.

4. The continuous speech recognition engine of claim 1, further comprising a phoneme decoder to compare a sound pattern of each phoneme to a set of phoneme models to recognize the sound feature frames as a sequence of phonemes and identify each phoneme, and the phoneme decoder is to supply each identified phoneme to the coarse sound representation generator.

5. The continuous speech recognition engine of claim 1, wherein the fine speech recognizer is to recognize the sound feature frames as the recognized word in a particular human language and sub dialect of the particular human language, and associate language parameters with the recognized word.

6. The continuous speech recognition engine of claim 1, wherein the input subsystem is to filter out background noise from the audio data and parse sounds within the audio data to discrete phonemes.

7. The continuous speech recognition engine of claim 1, wherein the coarse match generator is to cooperate with plural human language models to determine the confidence level parameter for the recognized word.

8. The continuous speech recognition engine of claim 1, further comprising a user interface to receive query words from a client machine to find out if the audio data contains any of the query words.

9. The continuous speech recognition engine of claim 1, wherein the fine speech recognizer is to determine a plurality of candidate recognizable words that correspond to the sound feature frames, where the sound feature frames are for a particular spoken word in the audio data, and the at least one processor is to:
compare the coarse sound representation to each of plural known sounds in the database, the plural known sounds corresponding to different ones of the recognizable words, and
assign a respective confidence level parameter to each of the recognizable words according to the comparing of the coarse sound representation to a respective one of the plural known sounds in the database.

10. The continuous speech recognition engine of claim 9, wherein each of the assigned confidence level parameters includes a likelihood that the coarse sound representation is the respective one of the recognizable words.

11. The continuous speech recognition engine of claim 1, wherein the fine speech recognizer is to provide start and stop times defining the time duration of the recognized word, and the coarse sound representation generator is to receive the start and stop times.

12. A method for speech recognition, comprising:
converting, by a system having a processor, audio data into a time coded sequence of sound feature frames for speech recognition;
receiving, by the system, the time coded sequence of sound feature frames and applying a speech recognition process of a first speech recognizer to the sound feature frames to determine at least one candidate recognized word that corresponds to the sequence of sound feature frames;
generating, by a coarse sound representation generator in the system, a coarse sound representation that contains a series of individual phonemes occurring within a time duration of the recognized word; and
comparing, by the system, the coarse sound representation to a known sound of the recognized word in a database and then assigning a confidence level parameter to the recognized word produced by the first speech recognizer based on the comparison.

13. The method of claim 12, further comprising:
assigning higher weights to recognized words with respective confidence level parameters above a threshold than recognized words with respective confidence level parameters below the threshold; and
in response to a query, filtering out recognized words with confidence level parameters below the threshold from a response to the query.

14. The method of claim 12, further comprising:
monitoring call center audio conversations and identifying when trigger words of interest are spoken, and then triggering an event notification across a network to a client machine so a user on the client machine can activate the event notification to allow the user to listen to a segment of the audio data pertinent to when the trigger words are spoken in the audio data.

15. The method of claim 12, further comprising:
generating a transcript, where each transcribed word in the transcript has a respective confidence level parameter as a measure of how confident the system is that the word was correctly identified.

16. The method of claim 12, further comprising:
outputting the confidence level parameter with the recognized word, along with start and stop time codes corresponding to the time duration.

17. The method of claim 12, further comprising:
performing speech data analytics on a word in the audio data based on the confidence level parameter, including categorizing automated speech recognition results on an individual word basis within the audio data based on how likely each word has been correctly recognized.

18. The method of claim 12, wherein determining the at least one candidate recognized word comprises determining a plurality candidate recognizable words that correspond to the sound feature frames, where the sound feature frames are for a particular spoken word in the audio data, the method further comprising:
comparing the coarse sound representation to each of plural known sounds in the database, the plural known sounds corresponding to different ones of the recognizable words, and
assigning a respective confidence level parameter to each of the recognizable words according to the comparing of the coarse sound representation to a respective one of the plural known sounds in the database.

19. The method of claim 18, wherein each of the assigned confidence level parameters includes a likelihood that the coarse sound representation is the respective one of the recognizable words.

20. The method of claim 12, wherein the speech recognition process is performed by a fine speech recognizer, and the coarse sound representation is performed by a coarse sound representation generator.

21. A non-transitory computer readable storage medium storing instructions that upon execution cause a system to:
convert audio data into a time coded sequence of sound feature frames for speech recognition;
receive the time coded sequence of sound feature frames and apply a speech recognition process of a first speech recognizer to the sound feature frames to determine at least one candidate recognized word that corresponds to the sequence of sound feature frames;
generate, using a coarse sound representation generator, a coarse sound representation of the recognized word that contains a series of individual phonemes occurring within a time duration of the recognized word; and
compare the coarse sound representation to a known sound of the recognized word in a database and then assign a confidence level parameter to the recognized word produced by the first speech recognizer based on the comparison.

22. The non-transitory computer readable storage medium of claim 21, wherein determining the at least one candidate recognized word comprises determining a plurality of candidate recognizable words that correspond to the sound feature frames, where the sound feature frames are for a particular spoken word in the audio data, wherein the instructions upon execution cause the system to further:
compare the coarse sound representation to each of plural known sounds in the database, the plural known sounds corresponding to different ones of the recognizable words, and
assign a respective confidence level parameter to each of the recognizable words according to the comparing of the coarse sound representation to a respective one of the plural known sounds in the database.

23. The non-transitory computer readable storage medium of claim 22, wherein each of the assigned confidence level parameters includes a likelihood that the coarse sound representation is the respective one of the recognizable words.

* * * * *